(12) United States Patent
Peng et al.

(10) Patent No.: US 12,340,141 B2
(45) Date of Patent: Jun. 24, 2025

(54) VIDEO GENERATION METHOD, APPARATUS, SYSTEM, DEVICE AND STORAGE MEDIUM

(71) Applicant: Beijing Zitiao Network Technology Co., Ltd., Beijing (CN)

(72) Inventors: Zipei Peng, Beijing (CN); Jiawei Wang, Beijing (CN); Bo Qiu, Beijing (CN); Jianren Zhou, Beijing (CN); Jianfeng Zhang, Beijing (CN); Wenbin Wu, Beijing (CN); Leihe Zhao, Beijing (CN); Wei Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/391,175

(22) Filed: Dec. 20, 2023

(65) Prior Publication Data

US 2024/0118855 A1  Apr. 11, 2024

Related U.S. Application Data

(63) Continuation of application No. PCT/CN2022/116648, filed on Sep. 2, 2022.

(30) Foreign Application Priority Data

Sep. 30, 2021  (CN) .......................... 202111165848.6

(51) Int. Cl.
*G06F 3/14* (2006.01)
*G06F 3/0482* (2013.01)
(Continued)

(52) U.S. Cl.
CPC .......... *G06F 3/1454* (2013.01); *G06F 3/0482* (2013.01); *G06F 3/0483* (2013.01); *H04L 65/1069* (2013.01); *H04L 65/1093* (2013.01)

(58) Field of Classification Search
CPC .................................................... G07F 3/1454
(Continued)

(56) References Cited

U.S. PATENT DOCUMENTS

| 9,824,477 B1 | 11/2017 | McDonald |
| 2006/0005136 A1 | 1/2006 | Wallick et al. |

(Continued)

FOREIGN PATENT DOCUMENTS

| CA | 3044258 A1 | 6/2018 |
| CN | 106683506 A | 5/2017 |

(Continued)

OTHER PUBLICATIONS

Extended European Search Report for European Patent Application No. 22874551.9, mailed on Sep. 12, 2024, 7 pages.

(Continued)

*Primary Examiner* — Ruay Ho
(74) *Attorney, Agent, or Firm* — Astute IP Law Group

(57) ABSTRACT

The present disclosure provides a video generation method, an apparatus, a system, a device and a storage medium. The method is applied to a video generation system, and the video generation system includes a first client and at least one second client. Specifically, the method includes: firstly, the first client creates a first virtual room and sets a target capturing effect for the first virtual room; then, the second client acquires a first video added with the target capturing effect after receiving a notification message that a current user has successfully joined the first virtual room, and uploads the first video to the first virtual room. Further, the first client acquires a target video from the first virtual room and generates a target result video based on the target video, and the target video includes the first video.

17 Claims, 6 Drawing Sheets

(51) Int. Cl.
*G06F 3/0483* (2013.01)
*H04L 65/1069* (2022.01)
*H04L 65/1093* (2022.01)

(58) Field of Classification Search
USPC .......................... 715/720; 709/204; 705/7.25
See application file for complete search history.

(56) References Cited

U.S. PATENT DOCUMENTS

| | | | |
|---|---|---|---|
| 2013/0268592 A1* | 10/2013 | Yerli | G06Q 50/00 |
| | | | 709/204 |
| 2016/0110669 A1* | 4/2016 | Iyer | G06Q 10/06315 |
| | | | 705/7.25 |
| 2017/0076177 A1 | 3/2017 | Allie et al. | |
| 2017/0103432 A1* | 4/2017 | Borchetta | G06Q 30/0279 |
| 2018/0150985 A1 | 5/2018 | McDonald | |
| 2018/0262713 A1* | 9/2018 | Huang | G06T 15/20 |
| 2019/0392623 A1 | 12/2019 | McDonald | |
| 2020/0329087 A1* | 10/2020 | Dinulica | H04L 63/0442 |
| 2021/0192817 A1 | 6/2021 | McDonald | |
| 2022/0070232 A1* | 3/2022 | Young | G06T 19/003 |
| 2022/0197403 A1* | 6/2022 | Hughes | G06F 3/011 |
| 2022/0377407 A1* | 11/2022 | Marchuk | H04N 21/8547 |
| 2023/0068093 A1* | 3/2023 | Malekian | G06F 30/13 |
| 2023/0206524 A1 | 6/2023 | Scott | |

FOREIGN PATENT DOCUMENTS

| | | |
|---|---|---|
| CN | 107734257 A | 2/2018 |
| CN | 110035321 A | 7/2019 |
| CN | 110266968 A | 9/2019 |
| CN | 111371993 A | 7/2020 |
| CN | 111726536 A | 9/2020 |
| CN | 112153288 A | 12/2020 |
| EP | 3142116 A1 | 3/2017 |
| EP | 3549105 A1 | 10/2019 |
| JP | H11275459 A | 10/1999 |
| JP | 2017118417 A | 6/2017 |
| JP | 6737929 B2 * | 8/2020 |
| WO | 2018102450 A1 | 6/2018 |

OTHER PUBLICATIONS

Office Action for Chinese Patent Application No. 202111165848.6, mailed on Mar. 26, 2025, 19 pages.
Office Action for Japanese Patent Application No. 2023-578191, mailed on Jan. 28, 2025, 8 pages.

* cited by examiner

VIDEO GENERATION METHOD, APPARATUS, SYSTEM, DEVICE AND STORAGE MEDIUM

CROSS-REFERENCE TO RELATED APPLICATIONS

The present application is a continuation of International Patent Application No. PCT/CN2022/116648, filed on Sep. 2, 2022, which claims priority of the Chinese Patent Application No. 202111165848.6, filed on Sep. 30, 2021 and titled "VIDEO GENERATION METHOD, APPARATUS, DEVICE AND STORAGE MEDIUM", the disclosure of which is incorporated herein by reference in its entirety.

TECHNICAL FIELD

The present disclosure relates to the field of data processing, in particular to a video generation method, an apparatus, a system, a device and a storage medium.

BACKGROUND

With the rapid development of internet short video technology, people's enthusiasm for video creation is increasing. Therefore, how to enrich video creation functions and improve user experience in video creation is an urgent technical problem that needs to be solved.

SUMMARY

In order to solve the above technical problems or at least partially solve the above technical problems, embodiments of the present disclosure provide a video generation method, which can realize multi-person online cooperative video generation based on the video generation system, which enriches video creation functions and improves user experience in video creation.

In a first aspect, the present disclosure provides a video generation method, the method is applied to a video generation system which includes a first client and at least one second client, and the method includes:
creating, by the first client, a first virtual room and setting a target capturing effect for the first virtual room;
acquiring, by the second client, a first video added with the target capturing effect after receiving a notification message that a current user has successfully joined the first virtual room, and uploading, by the second client, the first video to the first virtual room; and
acquiring, by the first client, a target video from the first virtual room and generating a target result video based on the target video; the target video includes the first video.

In an optional implementation, uploading the first video to the first virtual room includes:
serializing original materials and video effects in the first video and uploading the serialized first video to the first virtual room; the video effects include the target capturing effect;
correspondingly, generating the target result video based on the target video includes:
restoring a video editing scene of the first video based on the original materials and the video effects in the first video;
receiving an editing operation for the first video based on the video editing scene to obtain a corresponding editing result video of the first video; the editing operation includes an editing operation for the video effects; and
generating the target result video based on the corresponding editing result video of the first video.

In an optional implementation, after creating a first virtual room by the first client, the method further includes:
displaying, by the first client, a list of room users corresponding to the first virtual room; the list of room users includes a video acquisition status corresponding to the user that has successfully joined the first virtual room.

In an optional implementation, acquiring, by the second client, the first video added with the target capturing effect after receiving the notification message that the current user has successfully joined the first virtual room, includes:
displaying, by the second client, a capturing page upon receiving the notification message that the current user has successfully joined the first virtual room; and
acquiring the first video added with the target capturing effect based on the capturing page.

In an optional implementation, after acquiring the first video added with the target capturing effect based on the capturing page, the method further includes:
jumping from the capturing page to a video editing page, and editing the first video based on the video editing page;
correspondingly, uploading the first video to the first virtual room includes:
uploading the first video to the first virtual room in response to a trigger operation for a preset first control on the video editing page.

In a second aspect, the present disclosure provides a video generation method, the method includes:
creating a first virtual room and setting a target capturing effect for the first virtual room; and
acquiring a target video from the first virtual room and generating a target result video based on the target video; the target video is added with the target capturing effect, and the target video is uploaded by a user that has successfully joined the first virtual room.

In an optional implementation, the target video is obtained by serializing original materials and video effects, and generating the target result video based on the target video includes:
restoring a video editing scene of the target video based on the original materials and the video effects in the target video;
receiving an editing operation for the target video based on the video editing scene to obtain a corresponding editing result video of the target video; the editing operation includes an editing operation for the video effects; and
generating the target result video based on the corresponding editing result video of the target video.

In an optional implementation, after creating the first virtual room, the method further includes:
displaying a list of room users corresponding to the first virtual room; the list of room users includes a video acquisition status corresponding to the user that has successfully joined the first virtual room.

In a third aspect, the present disclosure provides a video generation method, the method includes:
acquiring a first video that is added with a target capturing effect corresponding to a first virtual room after receiving a notification message that a current user has successfully joined the first virtual room; and uploading the first video to the first virtual room; the first video in the first virtual room is used to generate a target result video.

In an optional implementation, uploading the first video to the first virtual room includes:

serializing original materials and video effects in the first video and uploading the serialized first video to the first virtual room; the video effects includes the target capturing effect.

In an optional implementation, acquiring the first video that is added with the target capturing effect corresponding to the first virtual room after receiving the notification message that the current user has successfully joined the first virtual room, includes:

displaying a capturing page upon receiving the notification message that the current user has successfully joined the first virtual room; and acquiring the first video that is added with the target capturing effect corresponding to the first virtual room based on the capturing page.

In an optional implementation, after acquiring the first video that is added with the target capturing effect corresponding to the first virtual room based on the capturing page, the method further includes:

jumping from the capturing page to a video editing page, and editing the first video based on the video editing page;

correspondingly, uploading the first video to the first virtual room includes:

uploading the first video to the first virtual room in response to a trigger operation for a preset first control on the video editing page.

In a fourth aspect, the present disclosure provides a video generation system, the system includes a first client and at least one second client;

the first client is configured to create a first virtual room and set a target capturing effect for the first virtual room;

the second client is configured to acquire a first video added with the target capturing effect after receiving a notification message that a current user has successfully joined the first virtual room and upload the first video to the first virtual room; and the first client is further configured to acquire a target video from the first virtual room and generate a target result video based on the target video; the target video includes the first video.

In a fifth aspect, the present disclosure provides a video generation apparatus, the apparatus includes:

a creating module, configured to create a first virtual room and set a target capturing effect for the first virtual room; and a generating module, configured to acquire a target video from the first virtual room and generate a target result video based on the target video; the target video is added with the target capturing effect, and the target video is uploaded by a user that has successfully joined the first virtual room.

In a sixth aspect, the present disclosure provides a video generation apparatus, the apparatus includes:

a first acquisition module, configured to acquire a first video that is added with a target capturing effect corresponding to a first virtual room after receiving a notification message that a current user has successfully joined the first virtual room; and an uploading module, configured to upload the first video to the first virtual room; the first video in the first virtual room is used to generate a target result video.

In a seventh aspect, the present disclosure provides a computer-readable storage medium, instructions are stored on the computer-readable storage medium, and the instructions, upon being executed by a terminal device, cause the terminal device to implement the above method.

In an eighth aspect, the present disclosure provides a device, including a memory, a processor, and computer program that is stored on the memory and executable on the processor; the processor, upon executing the computer program, implements the above method.

In a ninth aspect, the present disclosure provides a computer program product, the computer program product includes computer program/instructions, the computer program/instructions, upon being executed by a processor, implements the above method.

Compared with the prior art, the technical solution provided by embodiments of the present disclosure have at least the following advantages.

Embodiments of the present disclosure provide a video generation method, which is applied to a video generation system, and the video generation system includes a first client and at least one second client. Specifically, firstly, the first client creates a first virtual room and sets a target capturing effect for the first virtual room. Then, the second client acquires a first video added with the target capturing effect after receiving a notification message that a current user has successfully joined the first virtual room, and uploads the first video to the first virtual room. Further, the first client acquires a target video from the first virtual room and generates a target result video based on the target video, and the target video includes the first video. It can be seen that embodiments of the present disclosure can realize multi-person online cooperative video generation based on the video generation system, which enriches video creation functions and improves user experience in video creation.

BRIEF DESCRIPTION OF THE DRAWINGS

The accompanying drawings, which are hereby incorporated in and constitute a part of the present description, illustrate embodiments of the present disclosure, and together with the description, serve to explain the principles of the embodiments of the present disclosure.

To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

DETAILED DESCRIPTION

To provide a clearer understanding of the objectives, features, and advantages of the embodiments of the present disclosure, the solutions in the embodiments of the present disclosure will be further described below. It should be noted that the embodiments in the present disclosure and features in the embodiments may be combined with one another without conflict.

Many specific details are described below to help fully understand the embodiments of the present disclosure. However, the embodiments of the present disclosure may also be implemented in other manners different from those described herein. Apparently, the described embodiments in the specification are merely some rather than all of the embodiments of the present disclosure.

At present, if a multi-person cooperative video generation is to be realized, it is usually needed to use the same mobile phone to capture videos, and then edit and synthesize the videos captured by many people on this mobile phone to get a final result video. Alternatively, everyone may use their own mobile phones to capture videos, and then send the captured videos to a person, who edits and synthesizes the received videos to obtain the final result video.

However, the above two ways to realize multi-person cooperative video generation have their limitations, which cannot meet users' needs for multi-person cooperative video generation.

Therefore, a video generation method provided by embodiments of the present disclosure is applied to a video generation system, which includes a first client and at least one second client. Specifically, firstly, the first client creates a first virtual room and sets a target capturing effect for the first virtual room. Then, the second client acquires a first video added with the target capturing effect after receiving a notification message that a current user has successfully joined the first virtual room, and uploads the first video to the first virtual room. Further, the first client acquires a target video from the first virtual room and generates a target result video based on the target video, and the target video includes the first video. It can be seen that embodiments of the present disclosure can realize multi-person online cooperative video generation based on the video generation system, which enriches video creation functions and improves user experience in video creation.

Figure 1:
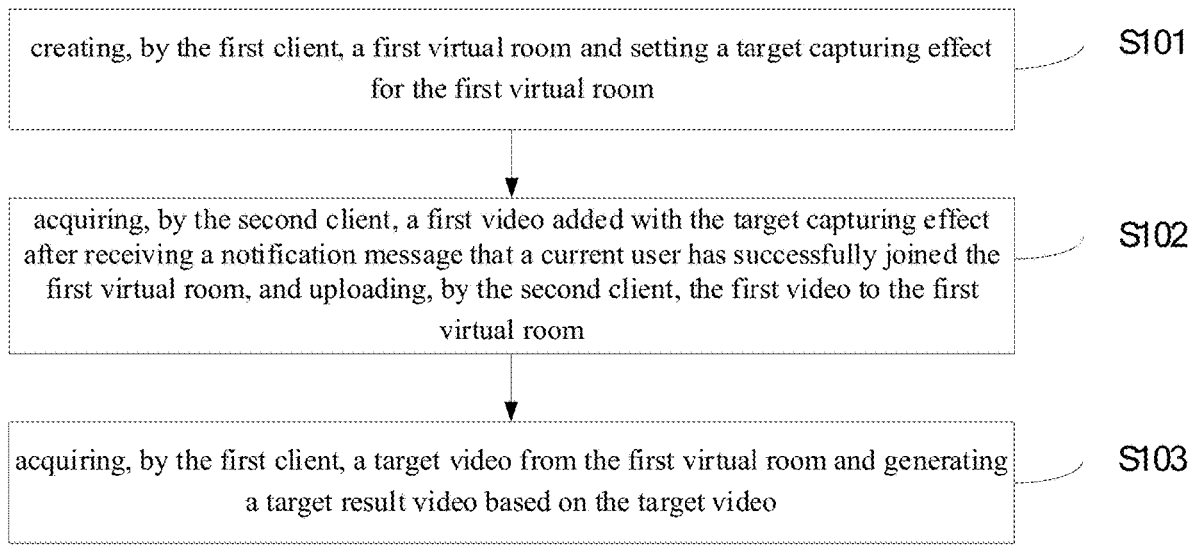
FIG. 1 is a flowchart of a video generation method provided by embodiments of the present disclosure.

Based on this, embodiments of the present disclosure provide the video generation method. Referring to FIG. 1, which is a flowchart of a video generation method provided by embodiments of the present disclosure, the method is applied to a video generation system, which includes a first client and at least one second client, and the method includes:

S101: creating, by the first client, a first virtual room and setting a target capturing effect for the first virtual room.

In embodiments of the present disclosure, in a scene of multi-person cooperative video generation, users participating in video creation are divided into two types, one of which is a host type and the other is a photographer type.

In practical application, a user who logs in to the first client is a user of the host type. It is assumed that the user who logs in to the first client is a first user. Before the multi-person cooperative video generation, the first user firstly creates the first virtual room on a server based on the first client, and then realizes multi-person online cooperative video generation based on the first virtual room.

In an alternative implementation, the first user may create the first virtual room by password, and other users may apply to join the virtual room uniquely corresponding to the password by inputting the password.

Figure 2:
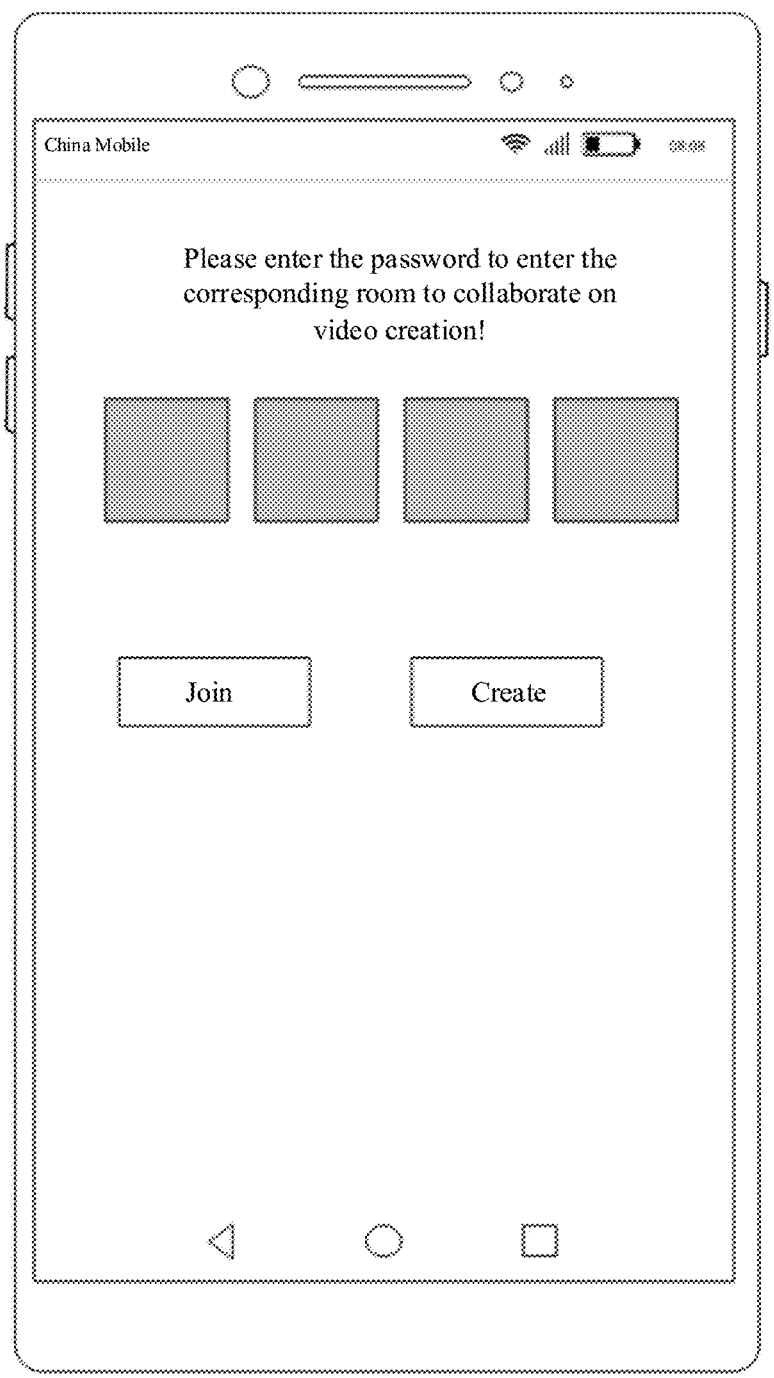
FIG. 2 is a schematic diagram of a page for joining a virtual room provided by embodiments of the present disclosure.

Referring to FIG. 2, which is a schematic diagram of a page for joining the virtual room provided by embodiments of the present disclosure, users may apply to join the first virtual room by inputting the password of the first virtual room and clicking the "Join" control. In addition, users may also create other virtual rooms based on this page.

In practical application, the first user of the first client may also set a target capturing effect for the first virtual room based on the demand of multi-person online cooperative video generation, so as to require other users that has successfully joined the first virtual room to capture a video based on the target capturing effect. The target capturing effect can include any one selected from effects such as sticker effect, prop effect and text effect, or any combination of multiple effects.

S102: acquiring, by the second client, a first video added with the target capturing effect after receiving a notification message that a current user has successfully joined the first virtual room, and uploading, by the second client, the first video to the first virtual room.

In embodiments of the present disclosure, a user who logs in to the second client is a user of the photographer type, and it is assumed that the user who logs in to the second client is the second user.

In practical application, the user of the second client may apply to join the first virtual room by inputting the password, and the password of the first virtual room is acquired offline. After receiving the notification message that the current user has successfully joined the first virtual room, the second client firstly acquires the target capturing effect corresponding to the first virtual room, and then obtains the first video based on the target capturing effect.

In an alternative implementation, the second client may capture the first video added with the target capturing effect through a camera. Specifically, upon receiving the notification message that the current user has successfully joined the first virtual room, the second client may display a capturing page, and then acquire the first video added with the target capturing effect based on the capturing page.

In another alternative implementation, the second client may select a video from user album page, and add the target capturing effect to the video to serve as the first video.

In practical application, the second client may perform video editing operation on the first video. Specifically, after acquiring the first video, it is jumped from the capturing page to a video editing page, and the first video is edited based on the video editing page. Embodiments of the present disclosure do not limit the specific video editing operation.

In an alternative implementation, a preset first control is set on the video editing page, and after editing the first video, the edited first video is triggered to be uploaded to the first virtual room by clicking the preset first control.

Figure 3:
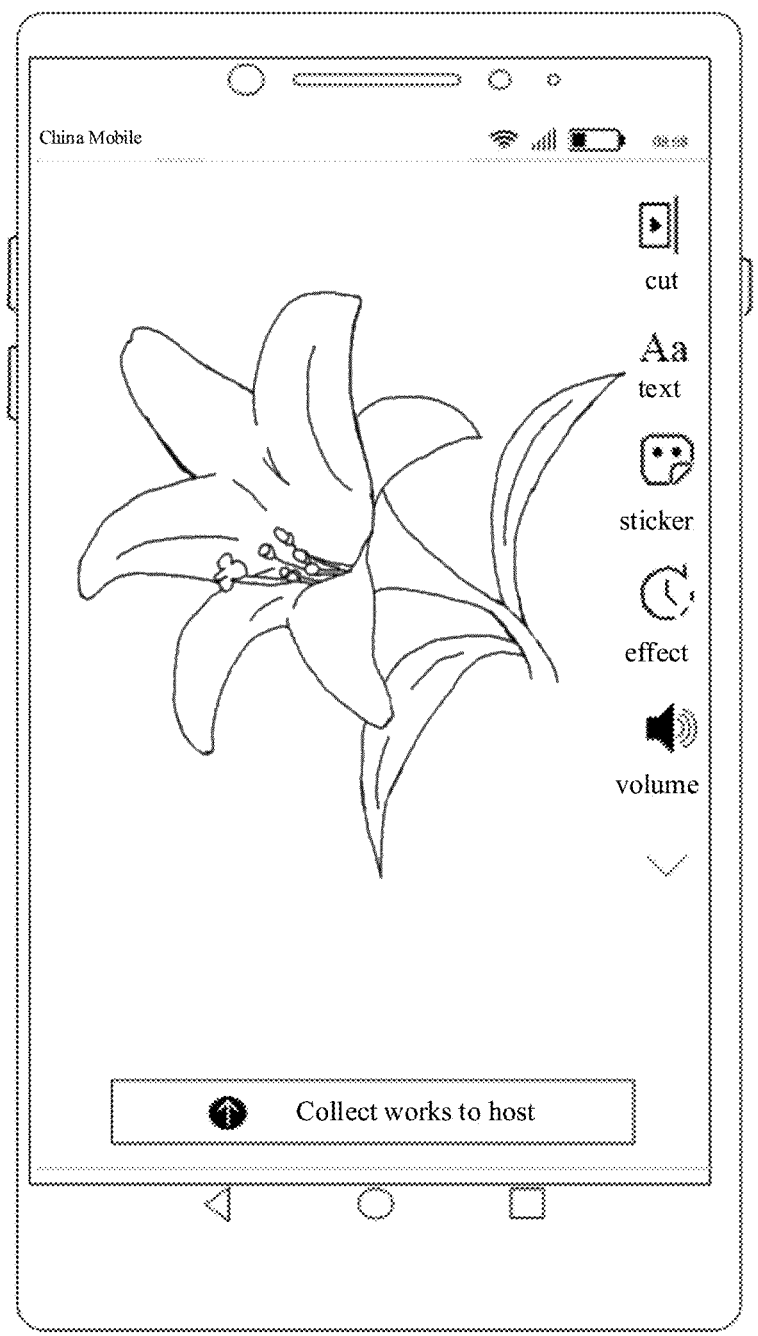
FIG. 3 is a schematic diagram of a video editing page provided by embodiments of the present disclosure.

As shown in FIG. 3, which is a schematic diagram of the video editing page provided by embodiments of the present disclosure, the displayed first video is edited on the video editing page, for example, by adding effects such as props, stickers, etc., and the edited first video is uploaded to the first virtual room by clicking the control of "Collect works to host".

In an embodiment of the present disclosure, after acquiring the first video added with the target capturing effect, the second client uploads the first video to the first virtual room, so that the first user of the first client may acquire the first video from the first virtual room, and the function of multi-person online cooperative video generation is realized.

In order to ensure that other users (such as the host user of the first client) may edit the first video for the second time, in embodiments of the present disclosure, the second client may serialize original materials and video effects in the first video, and then upload the serialized first video to the first virtual room. It is worth noting that the original materials and the video effects (such as props, stickers and other effects) in the serialized first video are editable.

S103: acquiring, by the first client, a target video from the first virtual room and generating a target result video based on the target video.

The target video includes the first video.

In an embodiment of the present disclosure, the first client may display a list of room users corresponding to the first virtual room, and through the list of room users, a video acquisition state corresponding to the user that has successfully joined the first virtual room is viewed. The video acquisition state, which is used to represent the acquisition state for the video of the corresponding user, includes a video not acquired state, a video being acquired state, a video acquired state, a video uploaded state, etc.

Figure 4:
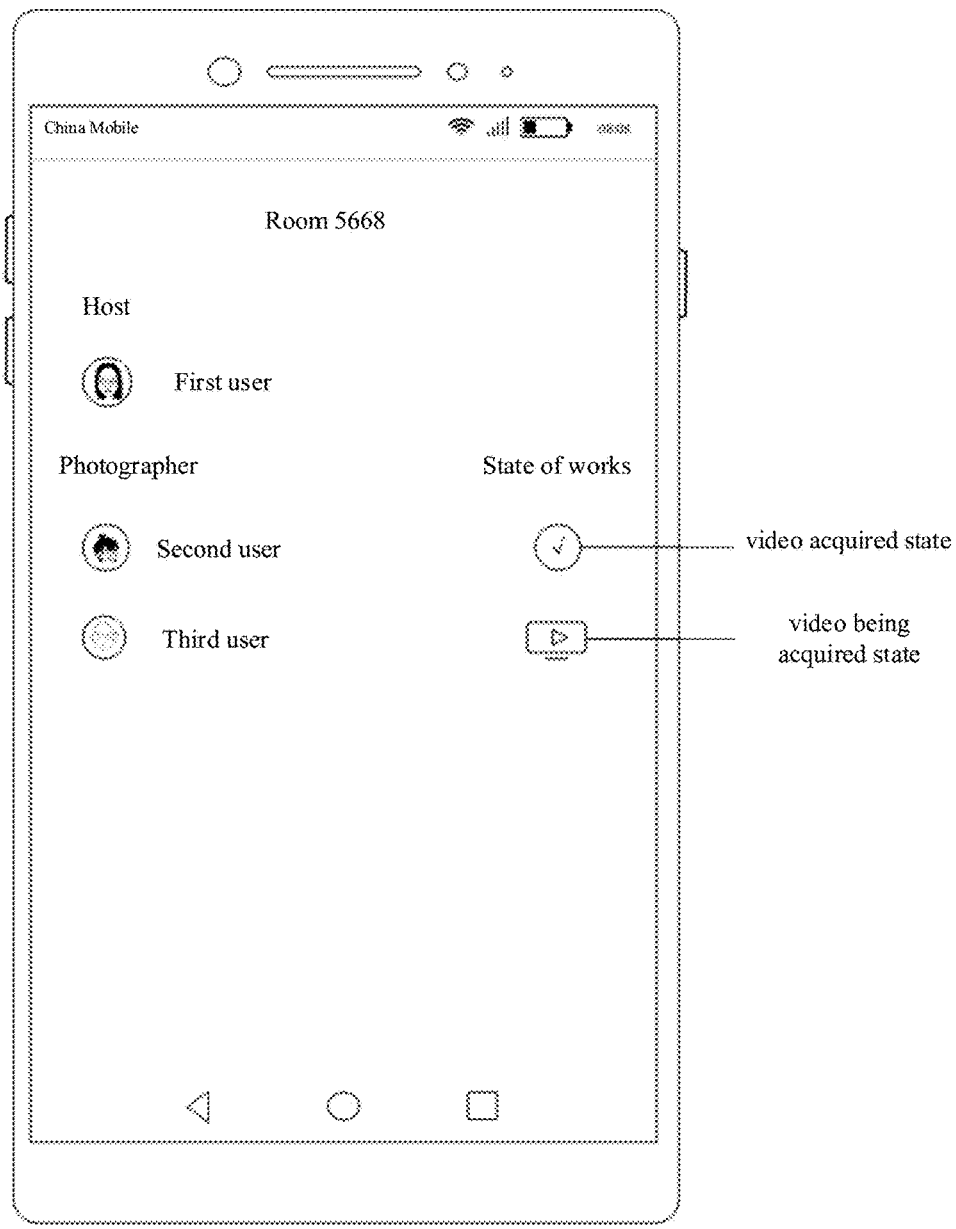
FIG. 4 is a schematic diagram of a display page of a list of room users provided by embodiments of the present disclosure.

As shown in FIG. 4, which is a schematic diagram of a display page of the list of room users provided by embodiments of the present disclosure, the first virtual room is room 5668, the first user is the host, and the photographers participating in capturing include the second user and a third user; the video acquisition state corresponding to the second user is the video acquired state, and the video acquisition state corresponding to the third user is the video being acquired state.

The first client may select at least one video selected from the videos which are uploaded to the first virtual room as the target video, then set a playback sequence for the at least one video, and then synthesize the at least one video into the target result video based on the playback sequence.

In an alternative implementation, the first user of the first client may edit the at least one video, respectively, such as adding stickers, props, effects, etc.

Taking the above-mentioned first video as an example, after acquiring the first video from the first virtual room as the target video, the first client restores a video editing scene of the first video based on the original materials and the video effects in the first video, and then receives an editing operation for the first video based on the video editing scene to obtain a corresponding editing result video of the first video. The editing operation may include an editing operation for video effects in the first video, such as adding stickers, prop effects, etc.

It is worth noting that the first video may be any video that is selected as the target video, and the first client obtains the target result video after editing the target video based on the above modes.

Since the target result video is generated based on videos uploaded by each user that has successfully joined the first virtual room, the target result video is the product of multi-person online cooperative video generation.

A video generation method provided by embodiments of the present disclosure is applied to a video generation system, which includes a first client and at least one second client. Specifically, firstly, the first client creates a first virtual room and sets a target capturing effect for the first virtual room. Then, the second client acquires a first video added with the target capturing effect after receiving a notification message that a current user has successfully joined the first virtual room, and uploads the first video to the first virtual room. Further, the first client acquires a target video from the first virtual room and generates a target result video based on the target video, and the target video includes the first video. It can be seen that embodiments of the present disclosure can realize multi-person online cooperative video generation based on the video generation system, which enriches video creation functions and improves user experience in video creation.

Figure 5:
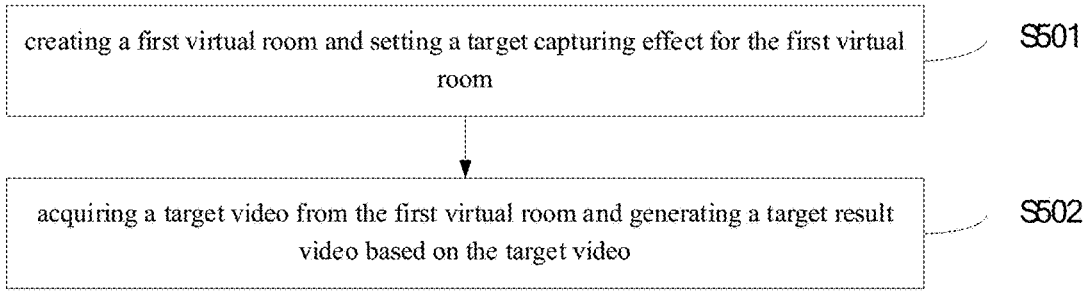
FIG. 5 is a flowchart of another video generation method provided by embodiments of the present disclosure.

Based on the above embodiments, embodiments of the present disclosure also provide a video generation method, referring to FIG. 5, which is a flowchart of another video generation method provided by embodiments of the present disclosure. The method is applied to the first client, that is, the client to which the user of the host type logs in, and the method specifically includes:

S501: creating a first virtual room and setting a target capturing effect for the first virtual room.

In an embodiment of the present disclosure, the first client firstly creates the first virtual room, and then set the target capturing effect for the first virtual room. For a user that has successfully joined the first virtual room, it is necessary to acquire a video added with the target capturing effect, and upload the obtained video to the first virtual room.

S502: acquiring a target video from the first virtual room and generating a target result video based on the target video.

The target video is added with the target capturing effect, and the target video is uploaded by the user that has successfully joined the first virtual room.

In an optional embodiment, the first client displays a list of room users corresponding to the first virtual room. The list of room users includes a video acquisition status corresponding to the users that has successfully joined the first virtual room, and the users of the first client may know the video acquisition status of each user through the list of room users.

After determining that each user in the first virtual room has completed uploading the videos based on the list of room users, the user of the first client may select the target video from the videos uploaded to the first virtual room to generate the target result video.

In order to enable the user of the first client to edit the video uploaded to the first virtual room for the second time, before uploading the video to the first virtual room, each user firstly serializes the original materials and the video effects in the video to make the video uploaded to the first virtual room editable.

After acquiring the target video from the first virtual room, the user of the first client may restore a video editing scene of the target video based on the original materials and the video effects in the target video. Then, based on the video editing scene, the editing operation for the target video is received, and a corresponding editing result video of the target video is obtained. Further, the target result video is generated based on the corresponding editing result video.

Embodiments of the present disclosure can realize multi-person online cooperative video generation based on the video generation system, which enriches video creation functions and improves user experience in video creation.

Figure 6:
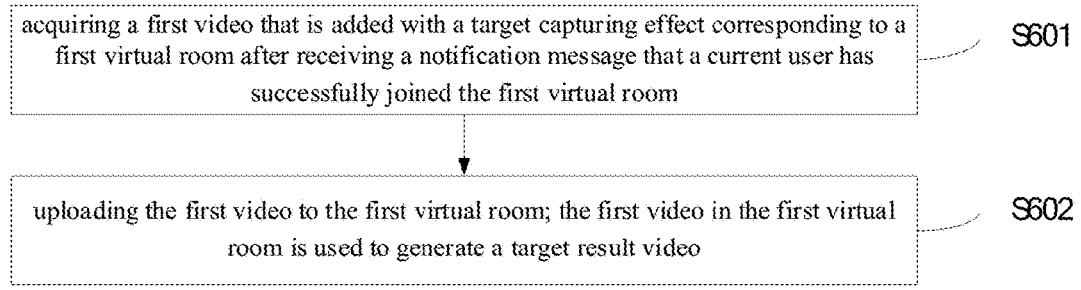
FIG. 6 is a flowchart of yet another video generation method provided by embodiments of the present disclosure.

Based on the above embodiments, embodiments of the present disclosure further provide a video generation method. Referring to FIG. 6, which is a flowchart of yet another video generation method provided by embodiments of the present disclosure. The method is applied to the second client, that is, the client to which the user of the photographer type logs in, and the method specifically includes:

S601: acquiring a first video that is added with a target capturing effect corresponding to a first virtual room after receiving a notification message that a current user has successfully joined the first virtual room.

In embodiments of the present disclosure, the user of the second client may apply to join the first virtual room based on the password, and upon receiving the notification message that the current user has successfully joined the first virtual room, a capturing page is displayed; and the first video, which is added with the target capturing effect corresponding to the first virtual room, is acquired based on the capturing page.

In an alternative implementation, the user of the second client may acquire, by capturing, the first video that is added with a target capturing effect corresponding to the first virtual room, or the user of the second client may select a video from user album and add the target capturing effect corresponding to the first virtual room to the selected video to obtain the first video.

In an alternative implementation, after acquiring the first video, it is jumped from the capturing page to a video editing page, and the first video is edited based on the video editing page, and then the edited first video is uploaded to the first virtual room upon receiving a trigger operation for a preset first control on the video editing page.

S602: uploading the first video to the first virtual room.

The first video in the first virtual room is used to generate a target result video.

In order to enable the video uploaded to the first virtual room to be edited for the second time, embodiments of the present disclosure may serialize original materials and video effects in the first video and upload the serialized first video to the first virtual room.

In an embodiment of the present disclosure, the video uploaded to the first virtual room is uploaded by the user that has successfully joined the first virtual room, and the target result video is generated based on the video in the first virtual room, thus realizing the function of multi-person online cooperative video generation, enriching video creation functions and improving user experience in video creation.

Figure 7:
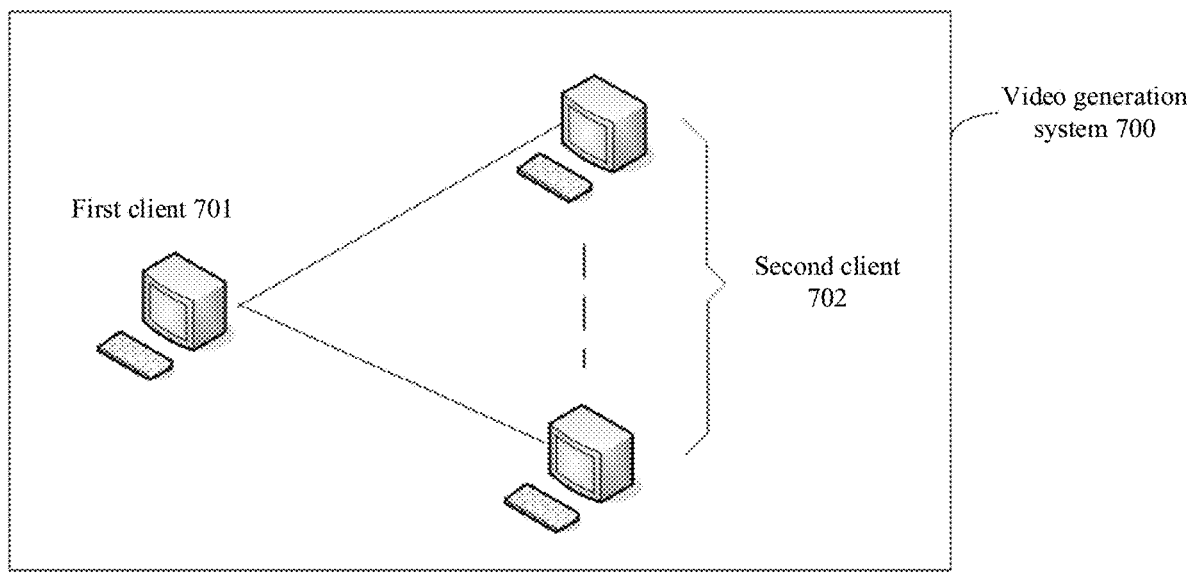
FIG. 7 is a schematic structural diagram of a video generation system provided by embodiments of the present disclosure.

Based on the content of the above method embodiments, embodiments of the present disclosure provide a video generation system, which includes a first client and at least one second client. Referring to FIG. 7, which is a structural schematic diagram of a video generation system provided by embodiments of the present disclosure, the video generation system 700 includes:

the first client 701, configured to create a first virtual room and set a target capturing effect for the first virtual room; and the second client 702, configured to acquire a first video added with the target capturing effect after receiving a notification message that a current user has successfully joined the first virtual room, and upload the first video to the first virtual room.

The first client 701 is further configured to acquire a target video from the first virtual room and generate a target result video based on the target video; the target video includes the first video.

In an alternative implementation, the second client is further configured to:
serialize original materials and video effects in the first video and uploading the serialized first video to the first virtual room; the video effects include the target capturing effect;
correspondingly, the first client is specifically configured to:
restore a video editing scene of the first video based on the original materials and the video effects in the first video; receive an editing operation for the first video based on the video editing scene to obtain a corresponding editing result video of the first video, in which the editing operation includes an editing operation for the video effects; and generate a target result video based on the corresponding editing result video of the first video.

In an alternative implementation, the first client is further configured to:
display a list of room users corresponding to the first virtual room; the list of room users includes a video acquisition status corresponding to the user that has successfully joined the first virtual room.

In an alternative implementation, the second client is specifically configured to:
display a capturing page upon receiving the notification message that the current user has successfully joined the first virtual room, and acquire the first video added with the target capturing effect based on the capturing page.

In an alternative implementation, the second client is further configured to:
jump from the capturing page to a video editing page, edit the first video based on the video editing page, and upload the first video to the first virtual room in response to a trigger operation for a preset first control on the video editing page.

The video generation system provided by embodiments of the present disclosure can realize multi-person online cooperative video generation, enrich video creation functions, and improve user experience in video creation.

Figure 8:
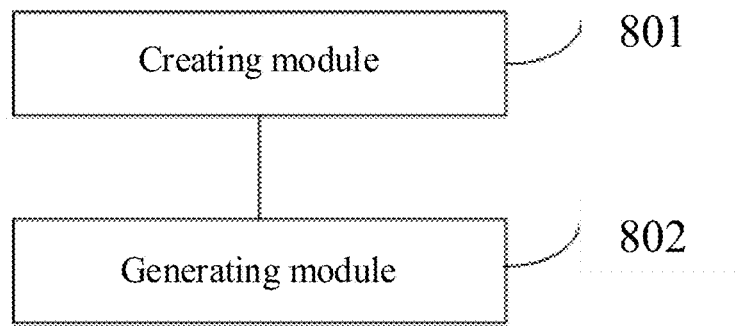
FIG. 8 is a schematic structural diagram of a video generation apparatus provided by embodiments of the present disclosure.

Based on the above method and system embodiments, the present disclosure further provides a video generation device. Referring to FIG. 8, which is a structural schematic diagram of a video generation apparatus provided by embodiments of the present disclosure, the apparatus includes:

a creating module 801, configured to create a first virtual room and set a target capturing effect for the first virtual room; and a generating module 802, configured to acquire a target video from the first virtual room and generate a target result video based on the target video; the target video is added with the target capturing effect, and the target video is uploaded by a user that has successfully joined the first virtual room.

In an alternative implementation, the target video is obtained by serializing original materials and video effects and uploading the serialized video, and the generating module includes:

a scene restoration sub-module, configured to restore a video editing scene of the target video based on the original materials and the video effects in the target video;

a receiving sub-module, configured to receive an editing operation for the target video based on the video editing scene to obtain a corresponding editing result video of the target video; the editing operation includes an editing operation for the video effects; and a generating sub-module, configured to generate a target result video based on the corresponding editing result video of the target video.

In an alternative implementation, the apparatus further includes:

a display module, configured to display a list of room users corresponding to the first virtual room; the list of room users includes a video acquisition status corresponding to the user that has successfully joined the first virtual room.

Figure 9:
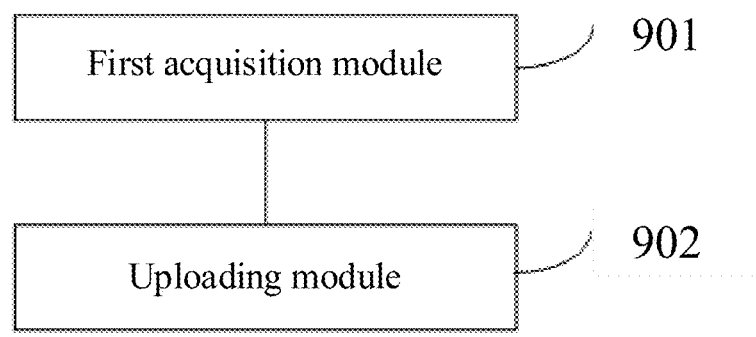
FIG. 9 is a structural schematic diagram of another video generation apparatus provided by embodiments of the present disclosure.

Based on the above method and system embodiments, the present disclosure further provides a video generation device. Referring to FIG. 9, which is a structural schematic diagram of another video generation apparatus provided by embodiments of the present disclosure, the apparatus includes:

a first acquisition module 901, configured to acquire a first video that is added with a target capturing effect corresponding to a first virtual room after receiving a notification message that a current user has successfully joined the first virtual room; and an uploading module 902, configured to upload the first video to the first virtual room;

the first video in the first virtual room is used to generate a target result video.

In an optional embodiment, the uploading module is specifically configured to:

serialize original materials and video effects in the first video and uploading the serialized first video to the first virtual room; the video effects include the target capturing effect In an alternative implementation, the first acquisition module includes:

a display sub-module, configured to display a capturing page upon receiving the notification message that the current user has successfully joined the first virtual room; and a first acquisition sub-module, configured to acquire the first video added with a target capturing effect corresponding to the first virtual room based on the capturing page.

In an alternative implementation, the apparatus further includes:

an editing module, configured to jump from the capturing page to a video editing page and edit the first video based on the video editing page;

correspondingly, the uploading module is specifically configured to:

upload the first video to the first virtual room in response to a trigger operation for a preset first control on the video editing page.

The video generation apparatus provided by embodiments of the present disclosure can realize multi-person online cooperative video generation, which enriches video creation functions and improves user experience in video creation.

In addition to the above methods and apparatuses, embodiments of the present disclosure further provide a computer-readable storage medium, instructions are stored on the computer-readable storage medium, and the instructions, upon being executed by a terminal device, cause the terminal device to implement the video generation method described in embodiments of the present disclosure.

Embodiments of the present disclosure also provide a computer program product, which includes computer program/instructions, and the computer program/instructions, upon being executed by a processor, implements the video generation method described in embodiments of the present disclosure.

Figure 10:
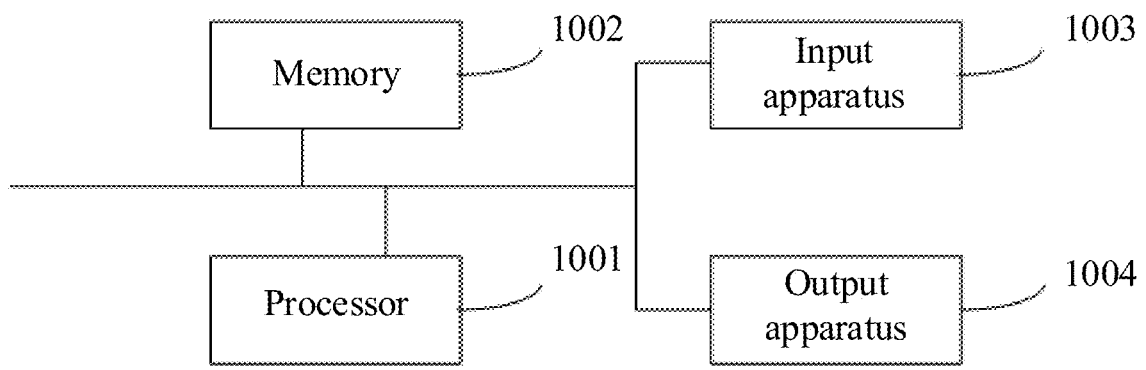
FIG. 10 is a schematic structural diagram of a video generation device provided by embodiments of the present disclosure.

In addition, embodiments of the present disclosure further provide a video generation device, as shown in FIG. 10, which may include:

a processor 1001, a memory 1002, an input apparatus 1003 and an output apparatus 1004. The number of the processor 1001 in the video generation device may be one or more, and one processor is taken as an example in FIG. 10. In some embodiments of the present disclosure, the processor 1001, the memory 1002, the input apparatus 1003 and the output apparatus 1004 may be connected through a bus or other means, and the connection through the bus is taken as an example in FIG. 10.

The memory 1002 may be configured to store software programs and modules, and the processor 1001 executes various functional applications and data processing of the video generation device by running the software programs and modules stored in the memory 1002. The memory 1002 may mainly include a program storage region and a data storage region, and the program storage region may store an operating system, application programs required by at least one function, etc. In addition, the memory 1002 may include high-speed random-access memory, and may also include non-volatile memory, such as at least one magnetic disk memory, flash memory, or other volatile solid-state memory. The input apparatus 1003 may be configured to receive inputted digital or character information and generate signal input related to user settings and function control of the video generation device.

Specifically, in the present embodiment, the processor 1001 may follow the following instructions to load executable files corresponding to the processes of one or more application programs into the memory 1002, and the processor 1001 may run the application programs stored in the memory 1002 to realize various functions of the above-mentioned video generation device.

It should be noted that in the present disclosure, relational terms, such as "first" and "second", etc., are merely used to distinguish one entity or operation from another entity or operation, and do not necessarily require or imply that there is any such factual relationship or order between these entities or operations. Moreover, the terms "including", "comprising" or any other variation thereof are intended to cover non-exclusive inclusion, so that a process, method, article or device that includes a series of elements includes not only these elements, but also other elements that are not explicitly listed or elements that are inherent to such process, method, article or device. Without further restrictions, an element defined by the phrase "including a/an . . . " does not exclude the existence of other identical elements in the process, method, article or device that includes the element.

What is described above is only the specific embodiments of the present disclosure, so that those skilled in the art can understand or realize the present disclosure. Many modifications to these embodiments will be obvious to those skilled in the art, and the general principles defined herein may be implemented in other embodiments without departing from the spirit or scope of the present disclosure. Therefore, the present disclosure is not limited to the embodiments described herein, but to be accorded the widest scope that is consistent with the principles and novel features disclosed herein.

What is claimed is:

1. A video generation method, wherein the method is applied to a video generation system which includes a first client and at least one second client, the method comprises:
creating, by the first client, a first virtual room and setting a target capturing effect for the first virtual room;
acquiring, by the at least one second client, a first video added with the target capturing effect after receiving a notification message that a current user has successfully joined the first virtual room, and uploading, by the at least one second client, the first video to the first virtual room; and
acquiring, by the first client, a target video from the first virtual room and generating a target result video based on the target video; wherein the target video includes the first video;
wherein the target capturing effect comprises at least one of sticker effect, prop effect, and text effect;
wherein the first client is different from the at least one second client; and
wherein uploading the first video to the first virtual room comprises:
serializing original materials and video effects in the first video and uploading the serialized first video to the first virtual room; wherein the video effects include the target capturing effect;
correspondingly, generating the target result video based on the target video comprises:
restoring a video editing scene of the first video based on the original materials and the video effects in the first video;
receiving an editing operation for the first video based on the video editing scene to obtain a corresponding editing result video of the first video; wherein the editing operation includes an editing operation for the video effects; and
generating the target result video based on the corresponding editing result video of the first video.

2. The method of claim 1, wherein acquiring, by the at least one second client, the first video added with the target capturing effect after receiving the notification message that the current user has successfully joined the first virtual room, comprises:
displaying, by the at least one second client, a capturing page upon receiving the notification message that the current user has successfully joined the first virtual room; and
acquiring the first video added with the target capturing effect based on the capturing page.

3. The method of claim 2, wherein after acquiring the first video added with the target capturing effect based on the capturing page, the method further comprises:
jumping from the capturing page to a video editing page, and editing the first video based on the video editing page;
correspondingly, uploading the first video to the first virtual room comprises:
uploading the first video to the first virtual room in response to a trigger operation for a preset first control on the video editing page.

4. A computer-readable storage medium, wherein instructions are stored on the computer-readable storage medium, and the instructions, upon being executed by a terminal device, cause the terminal device to implement the method according to claim 1.

5. A device, comprising: a memory, a processor, and computer program that is stored on the memory and executable on the processor, wherein the processor, upon executing the computer program, implements the method according to claim 1.

6. The device of claim 5, wherein after creating a first virtual room by the first client, the processor further implements:
displaying, by the first client, a list of room users corresponding to the first virtual room; wherein the list of room users includes a video acquisition status corresponding to a user that has successfully joined the first virtual room.

7. The method of claim 1, wherein after creating a first virtual room by the first client, the method further comprises:
displaying, by the first client, a list of room users corresponding to the first virtual room; wherein the list of room users includes a video acquisition status corresponding to the user that has successfully joined the first virtual room, and
the video acquisition status comprises at least one of a video not acquired state, a video being acquired state, a video acquired state, and a video uploaded state.

8. A video generation method, executed by a processor in a first client, comprising:
creating a first virtual room and setting a target capturing effect for the first virtual room; and
acquiring a target video from the first virtual room and generating a target result video based on the target video; wherein the target video is added with the target capturing effect, and the target video is uploaded from a second client by a user that has successfully joined the first virtual room;
wherein the target capturing effect comprises at least one of sticker effect, prop effect, and text effect;
wherein the first client is different from the second client,
wherein the target video is obtained by serializing original materials and video effects, and generating the target result video based on the target video comprises:
restoring a video editing scene of the target video based on the original materials and the video effects in the target video;
receiving an editing operation for the target video based on the video editing scene to obtain a corresponding editing result video of the target video; wherein the editing operation includes an editing operation for the video effects; and
generating the target result video based on the corresponding editing result video of the target video.

9. A computer-readable storage medium, wherein instructions are stored on the computer-readable storage medium, and the instructions, upon being executed by a terminal device, cause the terminal device to implement the method according to claim 8.

10. The device of claim 5, wherein the processor further implements:
serializing original materials and video effects in the first video and uploading the serialized first video to the first virtual room; wherein the video effects include the target capturing effect;
restoring a video editing scene of the first video based on the original materials and the video effects in the first video;

receiving an editing operation for the first video based on the video editing scene to obtain a corresponding editing result video of the first video; wherein the editing operation includes an editing operation for the video effects; and generating the target result video based on the corresponding editing result video of the first video.

11. A device, comprising: a memory, a processor, and computer program that is stored on the memory and executable on the processor, wherein the processor, upon executing the computer program, implements the method according to claim 8.

12. The method of claim 8, wherein after creating a first virtual room, the method further comprises:

displaying a list of room users corresponding to the first virtual room; wherein the list of room users includes a video acquisition status corresponding to the user that has successfully joined the first virtual room, and the video acquisition status comprises at least one of a video not acquired state, a video being acquired state, a video acquired state, and a video uploaded state.

13. A video generation method, executed by a processer in a second client, comprising:

acquiring a first video that is added with a target capturing effect set by a first client corresponding to a first virtual room created by the first client, after receiving a notification message that a current user has successfully joined the first virtual room; and uploading the first video to the first virtual room; wherein the first video in the first virtual room is used to generate a target result video;

wherein the target capturing effect comprises at least one of sticker effect, prop effect, and text effect, wherein the first client is different from the second client, and wherein uploading the first video to the first virtual room comprises:

serializing original materials and video effects in the first video and uploading the serialized first video to the first virtual room; wherein the video effects includes the target capturing effect.

14. The method of claim 13, wherein acquiring the first video that is added with the target capturing effect corresponding to the first virtual room after receiving the notification message that the current user has successfully joined the first virtual room, comprises:

displaying a capturing page upon receiving the notification message that the current user has successfully joined the first virtual room; and acquiring the first video that is added with the target capturing effect corresponding to the first virtual room based on the capturing page.

15. The method of claim 14, wherein after acquiring the first video that is added with the target capturing effect corresponding to the first virtual room based on the capturing page, the method further comprises:

jumping from the capturing page to a video editing page, and editing the first video based on the video editing page;

correspondingly, uploading the first video to the first virtual room comprises:

uploading the first video to the first virtual room in response to a trigger operation for a preset first control on the video editing page.

16. A computer-readable storage medium, wherein instructions are stored on the computer-readable storage medium, and the instructions, upon being executed by a terminal device, cause the terminal device to implement the method according to claim 13.

17. A device, comprising: a memory, a processor, and computer program that is stored on the memory and executable on the processor, wherein the processor, upon executing the computer program, implements the method according to claim 13.

* * * * *